(12) United States Patent
Siomina et al.

(10) Patent No.: US 8,838,141 B2
(45) Date of Patent: Sep. 16, 2014

(54) SIGNALLING MEASUREMENTS FOR POSITIONING IN A WIRELESS NETWORK

(75) Inventors: Iana Siomina, Solna (SE); Ari Kangas, Lidingo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/322,065

(22) PCT Filed: May 29, 2009

(86) PCT No.: PCT/SE2009/050625
§ 371 (c)(1),
(2), (4) Date: Jan. 19, 2012

(87) PCT Pub. No.: WO2010/138039
PCT Pub. Date: Dec. 2, 2010

(65) Prior Publication Data
US 2012/0122478 A1    May 17, 2012

(51) Int. Cl.
*H04W 24/00*    (2009.01)

(52) U.S. Cl.
USPC .................... 455/456.2; 455/446; 455/456.5; 370/311

(58) Field of Classification Search
USPC .................... 455/456.1, 456.5, 456.6, 456.2; 370/311
See application file for complete search history.

(56) References Cited

U.S. PATENT DOCUMENTS

| | | | |
|---|---|---|---|
| 2003/0040323 A1* | 2/2003 | Pihl et al. | 455/456 |
| 2005/0113117 A1* | 5/2005 | Bolin et al. | 455/456.6 |
| 2005/0288033 A1 | 12/2005 | McNew et al. | |
| 2008/0220784 A1* | 9/2008 | Somasundaram et al. | 455/437 |
| 2009/0131073 A1* | 5/2009 | Carlson et al. | 455/456.1 |

FOREIGN PATENT DOCUMENTS

| | | |
|---|---|---|
| CN | 1331896 A | 1/2002 |
| CN | 1864430 A | 11/2006 |
| EP | 1 755 356 A1 | 2/2007 |
| KR | 20050011868 A | 1/2005 |
| WO | WO 2005/011153 A1 | 2/2005 |

OTHER PUBLICATIONS

PCT International Search Report issued on Feb. 11, 2010 for International Application No. PCT/SE2009/050625, filed on May 29, 2009.
Chinese Office Action Corresponding to Chinese Patent Application No. 200980160674.5; Date Issued: Jan. 6, 2014; Foreign Text, 6 Pages, English Translation Thereof, 10 Pages.

* cited by examiner

*Primary Examiner* — Qun Shen
(74) *Attorney, Agent, or Firm* — Myers Bigel Sibley & Sajovec, PA

(57) ABSTRACT

A method in a signalling device for assisting in positioning of user equipment based on time measurements is provided. The signalling device is associated with an s-cell, which is recognized by the first network node as having limited functionality and is, therefore, not considerable for the user equipment as a candidate cell for serving the user equipment (for data transmission. The signalling device associated s-cell is part of a positioning neighbor list of neighbor cells. The neighbor cells in the list are configured to have time measurements performed thereon by the user equipment for enabling positioning. The signalling device is configured to transmit predefined reference signals in predefined subframes and according to a predefined pattern relating to preselected subcarriers and preselected time slots within a subframe. The signalling device obtains synchronization information and transmits reference signals according to the configuration and synchronized according to the obtained synchronization information. This enables the user equipment to receive and perform time measurements on the transmitted reference signals for positioning when the signalling device associated s-cell is in the positioning neighbor list.

10 Claims, 5 Drawing Sheets

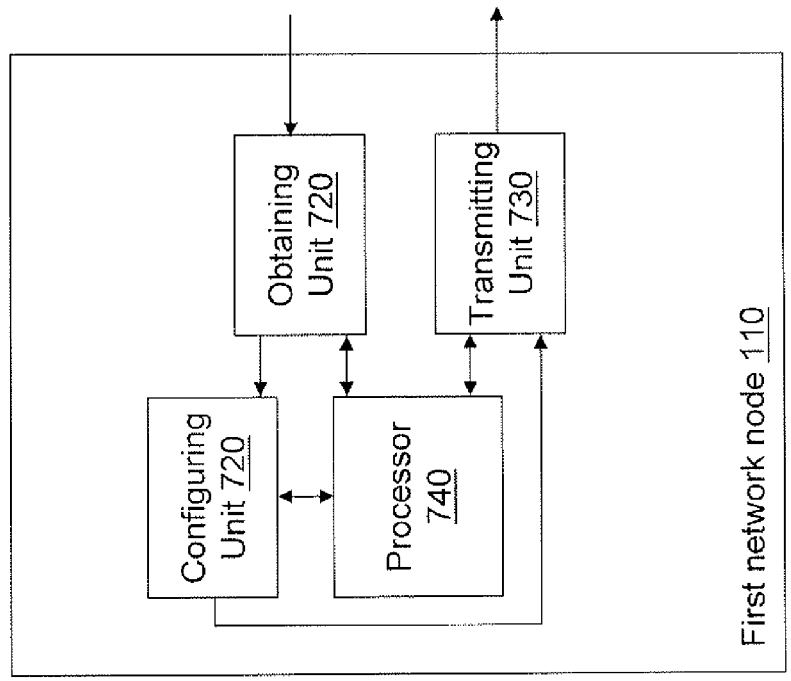
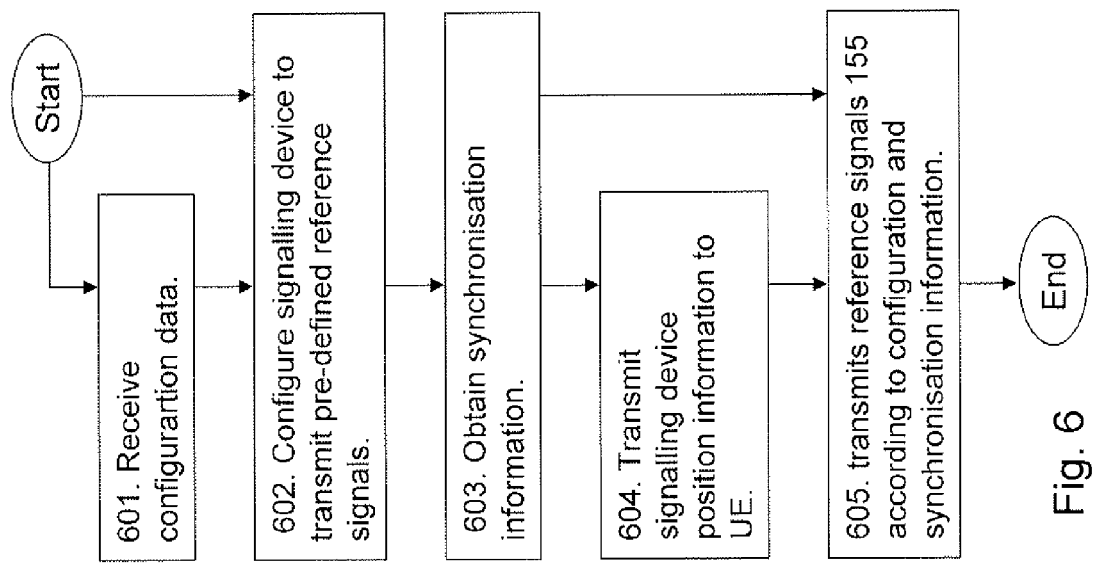

SIGNALLING MEASUREMENTS FOR POSITIONING IN A WIRELESS NETWORK

CROSS REFERENCE TO RELATED APPLICATIONS

This application is a 35 U.S.C. §371 national stage application of PCT International Application No. PCT/SE2009/050625, filed on 29 May 2009, the disclosure and content of which is incorporated by reference herein in its entirety. The above-referenced PCT International Application was published in the English language as International Publication No. WO 2010/138039 A1 on 2 Dec. 2010.

TECHNICAL FIELD

The present invention relates to a radio network node and a method in the radio network node. The invention further relates to a signalling device and in a method in the signalling device. In particular, it relates to assisting in positioning of a user equipment based on time measurements.

BACKGROUND

In a typical cellular system, also referred to as a wireless communications network, wireless terminals, also known as mobile stations and/or User Equipment units (UEs) communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-included, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. In 3GPP this work regarding the 3G Long Term Evolution (LTE) system is ongoing.

A large variety of services have been developed for wireless communications networks to enrich user experience by exploiting the possibility of identifying user equipment coordinates in the network. The services can be private or public, commercial or non-commercial. Some examples of commercial services are navigation assistance, social networking, location-aware advertising, etc. Basic emergency services are typically provided publicly and a certain minimum coverage within the operator's network is often required by regulatory bodies.

User positioning, which means positioning of a user equipment used by a user, is the process of determining user equipment coordinates in space. User positioning in wireless networks is particularly interesting due to users' mobility, but is also challenging with wide-spread network coverage, various environments and the dynamic nature of radio signals. Once the coordinates are available, the position can then be mapped to a certain place, or location. The mapping function and delivering the location information on request are a part of the location service which is required for the basic emergency services. Services that further exploit the location knowledge or are based on it to offer customers some additional value are referred to as location-aware and location-based services, respectively.

Different user and network services require different positioning accuracy levels, which in turn depend, among the others, on the positioning method used. Below are some of the commonly known positioning methods used in wireless communications:

Cell Identification (CI) wherein serving cell coverage is associated with a certain area, which can be used together with timing advance, making positioning more precise by measuring the round trip time;

Triangulation based on estimating Angles Of Arrival (AOA) measured from the phase difference of signals received from the same user equipment by different antenna elements;

Trilateration based on estimating Time Of Arrival (TOA), wherein the distance is calculated by estimating TOA of received signals from three or more sites;

Multilateration based on estimating Time Difference Of Arrival (TDOA) of signals from three or more sites;

Assisted GPS (A-GPS) which combines the mobile technology and GPS and enhancing user equipment receiver sensitivity by providing orbit and other data to the user equipment.

The accuracy of each of the methods depends also on the environment (e.g. rural, suburban, or urban; outdoor or indoor) and the measurements quality. A-GPS typically provides the best accuracy among the aforementioned methods, but requires GPS-equipped mobile terminals. TOA requires accurate time synchronization and in practice is less accurate than TDOA, although both methods require measurements from at least three sites.

Enhanced Observed Time Difference (E-OTD) and Observed TDOA (OTDOA), which are the two variants of TDOA, have been used in GSM and UMTS networks, respectively. Advanced Forward Link Trilateration (AFLT) has been adopted in CDMA networks.

Positioning procedure use any of the three approaches below:

Network-based, i.e. performed by the network (e.g., AOA),

Mobile-assisted, when a Serving Mobile Location Centre (SMLC) calculates the user equipment position based on the measurements reported by the user equipment (e.g., A-GPS, E-OTD, OTDOA), or Mobile-based, i.e., performed by user equipment (e.g., CI, AFLT).

A positioning method used in a cellular GSM network is depicted in U.S. Pat. No. 7,194,275 wherein additional control signals comprising virtual base station identification data are distributed in the radio system from well defined locations by e.g. transmitters. The control signals comprise base station identification data. The base station identification data is associated with a transmission location of the control signal comprising the base station identification data. Since there is a connection between each virtual base station identification data and the location from where it is transmitted, a mobile terminal can use the information for improving its position estimation according to conventional procedures. No modifications of the mobile terminals are therefore necessary. The mobile terminal is not able to connect to the communications system using the virtual base station identification data, since this data only is intended for position estimating purposes. In such a way, the devices for providing the additional information necessary for the improved position estimation can be made. However, in this method, a user equipment will spend unnecessary time and resources trying to establish whether the virtual cell is a good candidate for cell selection or reselection in idle mode, or handover in active mode. There is a also need to control or carefully plan the transmit power of the virtual base stations.

The positioning methods that will be used in LTE have not been specified yet.

SUMMARY

It is therefore an object of the invention to provide a mechanism enabling positioning of a user equipment in an LTE wireless communications network or its evolution.

According to a first aspect of the invention, the object is achieved by a method in a first network node for assisting in positioning of a user equipment based on time measurements. The first network node is serving the user equipment and is comprised in a wireless Long Term Evolution (LTE) communications network. The first network node obtains a positioning neighbour list of neighbour cells associated to a serving area of the first network node. The positioning neighbour list comprises a special-purpose cell (s-cell). The s-cell is associated to a signalling device. The s-cell is recognized by the first network node as an s-cell with limited functionality and is therefore not considerable for the user equipment as a candidate cell for serving the user equipment for data transmission. The positioning neighbour list or the information necessary for the user equipment to find out the list of neighbour cells to be measured, is transmitted to the user equipment. The positioning neighbour list enables the user equipment to find the s-cell and perform time measurement on reference signals transmitted by the associated signalling device. The first network node then obtains from the user equipment, a measurement report or a positioning estimate of the user equipment. The measurement report and the positioning estimate is based on the time measurement performed by the user equipment on the reference signals transmitted by the signalling device.

According to a second aspect of the invention, the object is achieved by a method in a signalling device for assisting in positioning of a user equipment based on time measurements. The signalling device is associated to an s-cell. The s-cell is not considerable for the user equipment as a candidate cell for serving the user equipment for data transmission. The signalling device associated s-cell is comprised in a positioning neighbour list of neighbour cells. The positioning neighbour list is obtained in the first network node comprised in a wireless LTE communications network. The neighbour cells in the list are adapted to be performed time measurement on by the user equipment for enabling positioning. The signalling device is configured to transmit predefined reference signals in predefined subframes and according to a predefined pattern relating to preselected subcarriers and preselected time slots within a subframe. The signalling device obtains synchronisation information. The signalling device transmits reference signals according to the configuration and being synchronized according to the obtained synchronisation information. This enables the user equipment to receive and perform time measurements on the transmitted reference signals for positioning when the signalling device associated s-cell is comprised in the positioning neighbour list.

According to a third aspect of the invention, the object is achieved by a first network node for assisting in positioning of a user equipment based on time measurements. The first network node is comprised in a wireless LTE network. The first network node comprises an obtaining unit configured to obtain a positioning neighbour list of neighbour cells associated to a serving area of the first network node. The positioning neighbour list comprises an s-cell which s-cell is associated to a signalling device. The s-cell is recognized by the first network node as an s-cell with limited functionality and is therefore not considerable for the user equipment as a candidate cell for serving the user equipment for data transmission. The first network node further comprises a transmitting unit configured to transmit the positioning neighbour list or the information necessary for the user equipment to find out the list of neighbour cells to be measured, to the user equipment. The positioning neighbour list enables the user equipment to find the s-cell and perform time measurement on reference signals transmitted by the associated signalling device. The obtaining unit is further configured to obtain from the user equipment a measurement report or a positioning estimate of the user equipment, which measurement report or positioning estimate is based on the time measurement by the user equipment performed on the reference signals transmitted by the signalling device.

According to a fourth aspect of the invention, the object is achieved by a signalling device for assisting in positioning of a user equipment based on time measurements. The signalling device is associated to an s-cell. The s-cell is recognized by the first network node as an s-cell with limited functionality and is therefore not considerable for the user equipment as a candidate cell for serving the user equipment for data transmission. The signalling device associated s-cell is comprised in a positioning neighbour list of neighbour cells. The positioning neighbour list is obtained in a first network node comprised in a wireless LTE communications network. The neighbour cells in the list are adapted to be performed time measurement on by the user equipment for enabling positioning. The signalling device comprises a configuring unit adapted to configure the signalling device to transmit predefined reference signals in predefined subframes and according to a predefined pattern relating to preselected subcarriers and preselected time slots within a subframe. The signalling device further comprises an obtaining unit configured to obtain synchronisation information. The signalling device further comprises a transmitting unit configured to transmit reference signals according to the configuration and synchronized according to the obtained synchronisation information. This enables the user equipment to receive and perform time measurements on the transmitted reference signals for positioning when the signalling device associated s-cell is comprised in the positioning neighbour list.

Since the signalling device associated s-cell is comprised in a positioning neighbour list of neighbour cells that is transmitted to the user equipment and since the signalling device transmits reference signals, the user equipment is enabled to find the s-cell and perform time measurement on reference signals transmitted by the associated signalling device and since the first network node then obtains a measurement report or a positioning estimate of the user equipment based on the time measurements, a mechanism is provided that enables positioning of a user equipment in an LTE wireless communications system. The positioning neighbour list may further be a part of the assistance information transmitted, possibly in parts, from the serving cell to the user equipment 120 or can be figured out by the user equipment 120 based on the received assistance information.

Deploying signalling devices is much simpler and cheaper than deploying base stations, the signalling device is also much smaller in size, and do not generate much interference etc. and therefore give more flexibility when it comes to selecting their locations. This means that a signalling device may be installed closer to the potential user equipment locations where the user equipments experience, for example, the hearability problem, i.e. the signals to be measured for positioning are weak and/or not sufficiently many of them are of a good quality. With an installed signalling device, the situation is thus improved at a low cost and small amount of efforts.

An advantage with the invention is that it facilitates positioning and provides the necessary signaling of a higher quality in environments with unfavorable conditions, improving the quality (accuracy, delay, etc.) of positioning and services that use positioning information.

A further advantage with the invention is that it facilitates implementation of time-frequency reuse scheme only for the measured signals transmitted by the devices.

A further advantage with the invention is that it is applicable for LTE Frequency Division Duplex (FDD) and Time Division Duplex (TDD), both synchronized and non-synchronized.

A further advantage with the invention is that it allows for a cheap positioning service expansion.

A further advantage with the invention is that it gives more flexibility and control to operators over positioning, location service, location-aware and location-based services.

A yet further advantage with the invention is that it allows operators to reuse the device infrastructure for services, to use the signalling device infrastructure deployed by other economic agents, or share it, for example, over multiple carriers.

BRIEF DESCRIPTION OF THE DRAWINGS

The invention is described in more detail with reference to attached drawings illustrating exemplary embodiments of the invention and in which:

FIG. 6 is a flowchart depicting embodiments of a method in a signalling device.

FIG. 7 is a schematic block diagram illustrating embodiments of a signalling device.

DETAILED DESCRIPTION

Figure 1:
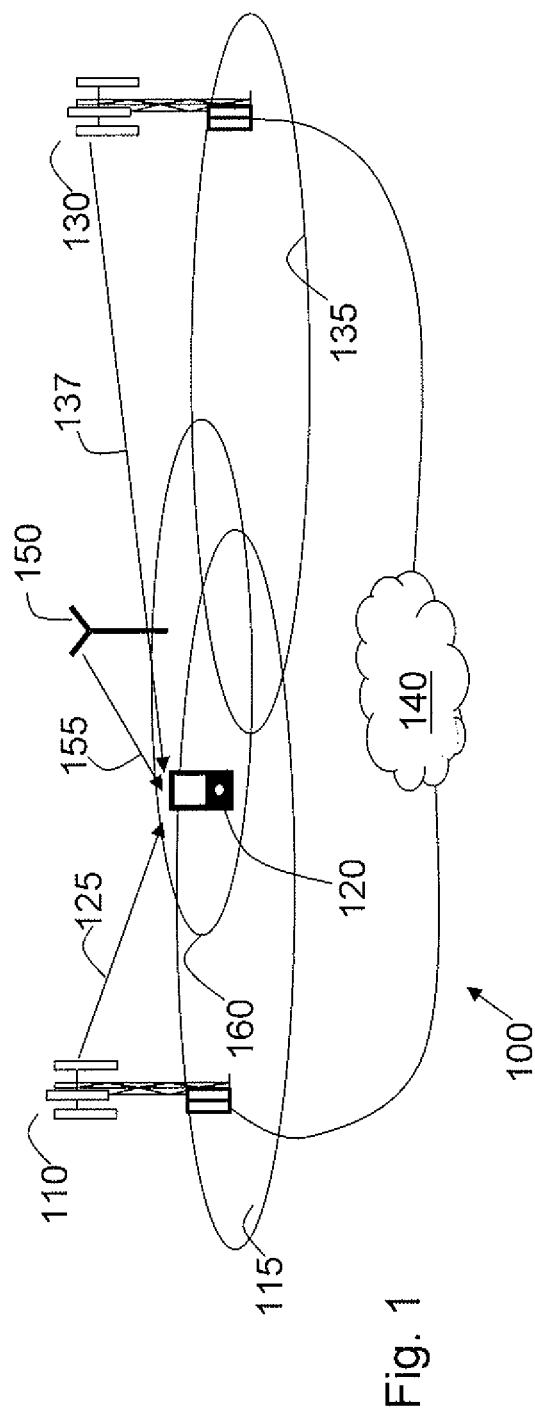
FIG. 1 is a schematic block diagram illustrating embodiments of a wireless communication network.

As part of the present solution, a problem will firstly be identified and discussed. As mentioned above, the positioning methods that will be used in LTE, have not been specified yet, but it is reasonable to assume that some of the existing positioning techniques used in the previous generation will also be adapted for LTE and some signal measurements will be used to define user positions. Two measurements candidates in the existing standard, both has been used in UMTS, are synchronization signals (SSs) SINR, reference signals (RSs) SINR (defined as RSRQ in LTE).

The signals meant for positioning measurements (synchronization, cell-specific reference signals, dedicated positioning reference, etc.), further referred to as the reference signals, are always transmitted on pre-defined resource symbols which makes them interfering/interfered to/by the same signals from other cells when the network is synchronous. In the asynchronous operation mode, the synchronization and reference symbols may overlap in time with other cell symbols used for the same signals, control channels or data channels.

Currently no TOA- or TDOA-based solution is specified for LTE. So, there is no existing solution to compare with. A straightforward approach would be to mimic the methods used in previous generations of cellular systems. However, as we outline in the following, these methods would be faced with coverage problems due to too low C/I, unless some measures are taken.

The following major problems with the existing solutions are foreseen if they are adapted for LTE:

1. Weak signals from neighbouring cells: To achieve high performance for most of the services (e.g., VoIP, video, TCP download or other data traffic, etc.), the other-to-own cell interference ratio measured on data channels needs to be minimized implying that real network deployments target to achieve high cell isolation by means of, for example, antenna tilting. The latter results also in weakening the neighbouring cells signals measured for positioning. The most suffering user equipments are typically those that are deep inside the cell and thus less exposed to signals from other cells. Recall that signals from three or more sites are needed for positioning.

2. Full-load interference generated by the measured signals: In a synchronized network, due to the pre-defined resource pattern for SS, the signals measured in a cell always face high interference from the neighbouring cells. The received interference corresponds to full load on the corresponding resource elements because of no power control and typically the always-transmit operation mode, unless a time-frequency reuse scheme is applied for the measured signals. (The problem does not apply for RSs for which reuse of three is used.)

3. Bad cross-correlation properties: In a synchronized network without a time-frequency reuse scheme for the measured signals, the interference is coming from signals of the same type that have bad orthogonality properties. The problem can result, for example, from using too short sequences or can be due to high cross-correlation for some pairs of sequences.

4. Flexibility, openness, and the ease of expansion: Positioning fully controlled by the network leaves the least flexibility for user applications, for network operators that might want to lease some parts of the infrastructure to the third-party service providers for providing some services, etc., and it also makes the expansion of single service coverage less flexible and more costly.

Problem (1) has been previously observed in the previous generation cellular networks and is particularly crucial in networks with no frequency reuse, e.g., in UMTS, and less crucial, for example, for GSM. Even with a sufficient number of detected signals, the low quality of the measured signals results in higher false alarm rates and thus poor positioning quality. The problem may be addressed by accumulating the signal power over multiple frames, although increasing the delay. Due to Problem (3), however, accumulation of the power may not give a desirable result.

To improve the measured neighbouring cells signals quality in UMTS, Idle Period DownLink (IPDL) has been used. With IPDL, Node B transmissions are synchronously ceased for a short period. The solution has a few drawbacks: it improves the measured neighbouring cells signals quality in UMTS but still may not solve Problem (1) in large cells where user equipments still may have problems with detecting the needed signals from neighbouring sites even during IPDL. The solution decreases the throughput due to switching off data transmissions over the entire band. Due to Problem (3), however, the IPDL solution may be not very suitable fore LTE.

To address Problem (1), A-GPS can be used in the network in combination with a method based on time measurements. Using the A-GPS method or a like is probably inevitable for services requiring high-accuracy positioning. A-GPS positioning, however, is still not a generic solution because not all user equipments are equipped with special GPS receivers which are costly and require extra chip space.

Problem (2) existed also, for example, in UMTS, where a signal is wide-band spread and interfered by any other transmission in neighbouring cells and partly interfered by transmissions in own cell (due to the non-orthogonality effect). The interference, however, is also generated by data transmissions which do not necessarily correspond to full load in the measured band.

For GSM, a frequency reuse larger than one is used on the Broadcast Channel (BCCH) frequency so the Problem (2) is not so severe.

When measuring SSs in LTE, Problem (3) occurs due to the short Zadoff-Chu sequences used by the technology. For example, to be at par with cdma2000, LTE would need 256 resource elements used for SSS. Also, some SSS pairs have poor cross-correlation properties.

Suppressing the interference when measuring the signals addresses Problem (1) and Problem (2), and may also help with Problem (3) if the interference reduction is large enough.

GSM also suffers from short sequences which give bad cross-correlation properties and hence the Problem (3).

With respect to Problem (4), there exists user software solutions allowing a user equipment to detect beacons transmitted by other networks, e.g. IEEE 802.11-conformant WLANs, and estimate the terminal position, provided that the WLAN Access Points (WLAN AP) position is known from the database locally maintained by the client. One of the problems with such a solution is that the user equipment memory may be not enough to maintain such a database. Another problem is that user equipment must be able to receive signals in the 2.4 GHz band. The solution is only limited to user equipment based positioning, which in addition often causes security concerns.

To summarize, the present solution addresses directly Problems (1) and (4). With respect to Problems (2) and (3), the present solution facilitates, for example, implementation time-frequency reuse schemes allowing for adopting them only for the measured signals and only in the proposed devices.

The general idea of the present solution is to provide complementary low-complexity signalling devices deployed in an LTE network as limited-functionality cells, so called s-cells, transmitting reference signals to be time-measured on by user terminals for positioning. The signalling device is configured, statically, semi-statically, or dynamically to transmit pre-defined reference signals in a predefined pattern relating to preselected subcarriers and preselected timeslots, The signalling devices may be coordinated by the LTE network and the signalling devices may implement a transmission time-frequency pattern that can differ from what the regular LTE network cells use to facilitate radio resource reuse for the measured signals.

FIG. 1 depicts a wireless communications network 100. The wireless communications network 100 is an LTE communication network using LTE technology or its further evolutions and is from now on called the LTE network 100. The LTE network 100 may also comprise networks with multiple radio technologies, so called multi-standard radio, where the LTE network or its evolution is one of the radio technologies. Then the present solution of positioning will be performed by means of the "LTE part" of that network.

The LTE network 100 comprises a first network node 110 serving a first cell 115. The first network node 110 uses LTE technology. The first network node 110 may be a base station such as e.g. a NodeB, an eNodeB, or a positioning control center in the core network 140 or any other network unit capable to communicate itself or via any base station over a radio carrier with a user equipment being present in the first cell.

A user equipment 120 is present within the first cell 115, is served by the first network node 110, and is therefore capable of communicating with the first network node 110 over a radio carrier. The user equipment 120 may be a mobile phone, a Personal Digital Assistant (PDA), or any other LTE network unit capable to communicate with a base station over a radio channel. The user equipment is referred to as UE on some of the figures. The first network node 110 transmits reference signals 125 that may be time-measured on by the user terminal 120 for positioning. The user equipment 120 knows that positioning shall be based on time measurement performed on reference signals.

The LTE system 100 may further comprise one or more second network nodes 130 serving one or more second cells 135. The second network node 130 uses LTE technology. In FIG. 1, one second network node 130 and one second cell 135 is depicted. The second network node 130 may be a base station such as a NodeB, an eNodeB or any other network unit capable to communicate over a radio carrier with a user equipment present in the second cell 135. The second network node 130 transmits reference signals 137 that may be performed time measurement on by the user terminal 120 for positioning.

The first network node 110 and the second network node 130 are connected to a core network 140. The core network 140 may maintain positions of the first network node 110 and second network node 130.

The LTE system 100 further comprises at least one signalling devices 150. The at least one signalling device 150 may also be referred to as an Assisting Reference Signalling Device (ARSD). The one or more signalling devices 150 transmits reference signals 155 within one or more s-cells 160. The s-cell 160 definition is similar to a normal cell, except that s-cell serves a special purpose i.e. positioning, and thus has a limited functionality. The coverage area of the s-cell 160 is the area where the received signal from the signalling device 150 is strong enough to be measured on by the user equipment 120. In FIG. 1, one signalling device 150 and one s-cell 155 is depicted. From the LTE network point of view, the signalling device 150 is indicated as a special-purpose cell, in this document denoted as an s-cell, and is recognized by the first network node 110 as an s-cell with limited functionality and is therefore not considerable for the user equipment 120 as a candidate cell for serving the user equipment 120 for data transmission. Similarly to how the core network 140 maintains positions of the first network node 110 and second network node 130, the core network 140 may also maintain the position of the signalling device 150. For embodiments regarding user equipment-based positioning, the core network 140 may not need to know the device position allowing the signalling device 150 to maintain its own position which may be sent it to the user equipment 120 on request. In these embodiments however another channel such as e.g. a broadcast channel, may additionally be implemented in the signalling device 150.

In some embodiments, the signalling device 150 position information may be maintained by the core network 140 e.g. in the first network node 110 such as in a base station or in a positioning control center in the core network 140 or in e.g. Serving Mobile Location Centre (SMLC), similarly as the core network 140 maintains positions of the first network node 110 and second network node 130. In this case the position information do not need to be sent, but the user equipment 120 needs to send its time measurements to the core network 140 via the first network node 110. The SMLC or the first network node 110 then estimates the position of the user equipment 120.

In some other embodiments, the signalling device 150 position information may be maintained by the user equipment 120. In these embodiments, the user equipment 120 does not send the time measurements, but calculates its own position by itself. The result will be reported to the core network 140 via the first network node 110.

In some further embodiments, e.g. when user equipment based positioning is used, i.e. when the user equipment 120 establishes the positioning of itself the core network 140 may not need to know the signalling device 150 position. In that case the signalling device 150 may be allowed to maintain its own position. In this case the signalling device 150 transmits its position information to the user equipment 120 e.g. using an implementation of another channel such as a broadcast channel and e.g. on request, if the user equipment 120 calculates own position itself. If the network calculates the user equipment 120 position, the signalling device position information should be transmitted to the core network 140 e.g. by radio or by means of a cable connection.

The reference signals 155 mentioned above, transmitted by the first network node 110, the second network node 130 and the signalling device 150, which transmitted reference signals are to be performed time measurement on by the user terminal 120 for positioning, may be any type of reference signal that can be performed time measurement on by a user terminal in a LTE network, such as e.g. Positioning-dedicated Reference Signals (PRS), Synchronization Signals (SSs) or Reference Signals (RSs). This will be described more in detail further on.

Positioning using a method based on time measurements such as e.g. OTDOA or TOA requires that the timing of at least three geographically dispersed base stations or signalling devices are measured. Therefore, it is necessary to ensure that the Signal-to-Noise Ratio (SNR) to the third strongest base station is high enough so that it can be detected by the user equipment 120. Cellular systems which reuse the same frequency band are designed to create strong isolation between cells, meaning that the signal from the own serving cell should be strong, while interference from the neighbouring base stations should be minimized. This means that the requirements for positioning and communication are conflicting. Since LTE is primarily a communication system, time measurements for positioning need to be done at very low Carrier-to-Interference ratio (C/I) to neighbouring base stations, which puts high requirements on the receiver of the user equipment 120 and also typically results in low positioning accuracy.

As mentioned above the timing can be measured e.g. by using some of the known reference signals that are always transmitted from an LTE base station such as e.g. PRSs, SSs or RSs.

SSs and RSs signals correspond to a set of physical resources and used to support physical-layer functionality. Both signal types are transmitted according to a pre-defined pattern, i.e., in selected subcarriers and time slots, and the pattern is typically very sparse.

In LTE, SSs are defined in downlink and are primarily used in the cell search procedure, i.e., for identifying cells and synchronizing to them in downlink after which the broadcast channel information can be read. Cell search is performed during the initial network access and at handovers. An SS comprises Primary and Secondary SSs (PSS and SSS, respectively) and encodes one of 504 pre-defined unique physical-layer cell identities that are grouped into 168 (0 . . . 167) unique physical-layer cell-identity groups, each containing 3 (0 . . . 2) unique physical-layer cell identities. First, a cell identity is read from PSS, and then the cell identity group is read from SSS. The cell identity can then be used to determine the reference signal sequence and its allocation in the time-frequency grid.

Synchronization signals are transmitted in subframe 0 and 5 in each radio frame. The PSS is transmitted in the last Orthogonal Frequency Division Multiplex (OFDM) symbol and the SSS in the second last OFDM symbol of a subframe. The SSs occupy 62 resource elements in the centre of the allocated bandwidth. An OFDM symbol is a multiplex of orthogonal sub-carriers, created in the frequency-domain initially and then converted to a time-domain waveform using the Inverse Fast Fourier Transform (IFFT).

Cell-specific reference signals are transmitted on specific resource elements. The signals are transmitted in every subframe and over the entire bandwidth. Different cells may use 6 different shifts in frequency and 504 different signals exist. In practice there is a reuse-three pattern for reference symbols.

Dedicated positioning reference signals are currently being discussed in 3GPP. PRS are to be transmitted in resource elements according to a certain pattern which may be the same or different by cells, subbands and/or subframes.

Figure 2:
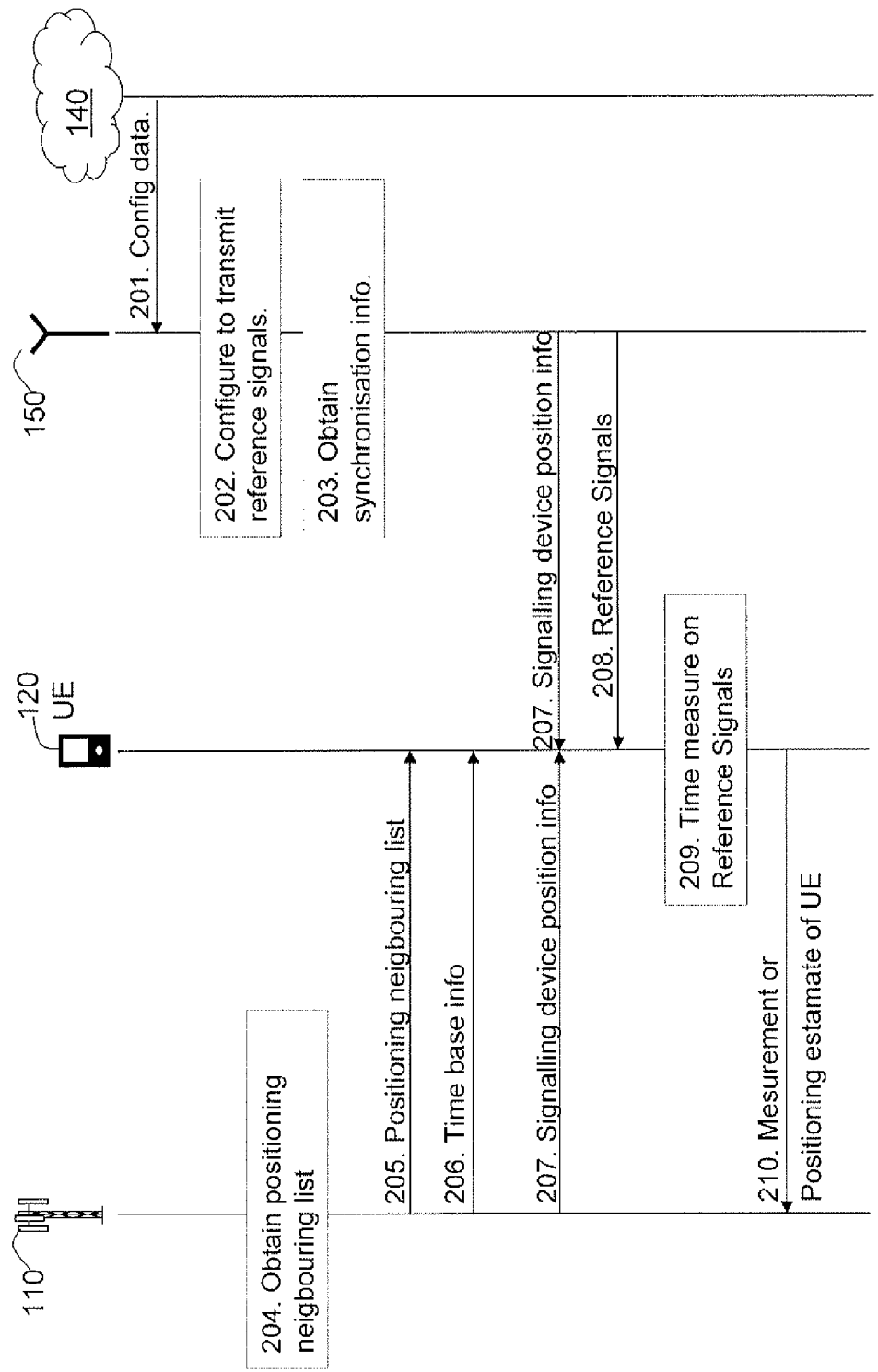
FIG. 2 is a combined schematic block diagram and flowchart depicting embodiments of a method.

The present solution will no be described with reference to the combined signalling diagram and flowchart depicted in FIG. 2. The user equipment 120 knows that positioning is based on time measuring reference signals 155 as mentioned above. The method comprising the following steps, which steps may as well be carried out in another suitable order than described below:

Step 201

In some embodiments configuring data is transmitted to the signalling device 150 from the core network 140. The configuring data is to be used for configuration of the signalling device 150 in the next step.

Step 202

In this step the signalling device 150 is configured to transmit pre-defined reference signals 155 in predefined subframes and according to a predefined pattern relating to preselected subcarriers and preselected time slots within a subframe. The signalling device 150 may e.g. be configured when being manufactured or later e.g. after receiving configuring data from the core network 140. The signalling device 150 may be configured statically or semi statically, e.g. by the device operator or by the core network 140 as mentioned above. The predefined pattern indicates on which resource elements the signal is to be transmitted, i.e. which subcarriers and which subframes, and indicates further when to transmit, i.e. in which time slots.

Step 203

In this step the signalling device 150 obtains synchronisation information. If the signalling device 150 is equipped with GPS or has access to, the synchronization may be obtained getting its own time and finding out the offset with respect to the LTE network. Depending on the configuration, the offset may be known at the signalling device 150, or the LTE network may inform the signalling device 150 about own timing with the respect to the absolute time. When there is no access to GPS, the signalling device 150 may use a time aligning mechanism to the serving cell 115.

Step 204

In this step the first network node 110 obtains a positioning neighbour list of neighbour cells associated to a serving area of the first network node 110. The positioning neighbour list may be maintained by the first network node 110 or the core network 140. The positioning neighbour list is a list of neighbouring cells, including regular cells and s-cells. At least two cells are required on the list, since received signals from three or more sites are required to be able to perform positioning establishment, i.e. the first cell 115 on which the user equipment 120 is camping and two further cells, e.g. the second cell 135 and the s-cell 160 as depicted in the example of FIG. 1. If the regular cells in the positioning neighbour list coincide with those measured by user equipment 120 for handover and are already known to the user equipment 120, the positioning neighbour list may contain only s-cells. At least one s-cell 160 is present in the positioning neighbour list.

There may also be several types of base stations in the network, i.e., macro, micro, pica, home Node B's, etc. —any of these may be in the positioning neighbour list if they are adapted to transmit the reference signals necessary for positioning measurements. Since the length of the neighbour list may be limited, obviously not all of them are included, but only those that are identified as the best. The serving cell 115 may typically also be in that list.

Step 205

Of some reason the user equipment 120, the first network node 110 or the core network 140 wishes to establish the position of the user equipment. The reason may e.g. be a positioning request from the core network 140 associated to a service of identifying the position of the user equipment 120 such as navigation assistance, social networking, location-aware advertising, basic emergency etc. In this step the first network node 110 transmits the positioning neighbour list or the information necessary for the user equipment to find out the list of neighbour cells to be measured to the user equipment 120. Transmitting a neighbour list comprises either an explicit list of neighbours or the information which enables the user equipment 120 to figure out what and when to measure. This step may e.g. be performed periodically or triggered by an event as exemplified above.

Step 206

This is an optional step. In this step the first network node transmits information about a time base. The time base information enables the user equipment 120 to perform time measurement on the s-cell 160 when the signalling device 150 and the first network node 110 have different time bases. Time base is a reference time used by the signalling device 150 for calculating the times when it needs to transmit. The signalling device needs to know its own time shift with respect to the time base. The time base may be used when the signalling device transmits subframes that are not aligned with the core network subframes but start with some +/−delta_time, also called "time shift".

While the positioning neighbour list may be sent to the user equipment 120 multiple times and may involve multiple devices, the one or more signalling devices' 150 time base may be transmitted only once when all the at least one signalling devices 150 use the same time base.

Step 207

If positioning is user equipment based, the user equipment 120 requests the signalling device position from the core network 140 or from the signalling device 150 which will be used for estimating own position based on the available information. In this step information about the position of the signalling device 150 is transmitted to the user equipment 120. The information may be maintained by the core network 140 and may then be transmitted to the user equipment 120 via the first network node 110, or the information may be maintained by and transmitted from the signalling device 150. This is referred to by two different alternative arrows with reference number 207 in FIG. 2.

Step 208

The signalling device 150 transmits reference signals 155 according to the configuration and being synchronized according to the obtained synchronisation information.

Note that the transmission of the reference signals 155 is not performed on request. The signalling device 150 transmits as instructed and configured. The user equipment 120 may or may not measure these signals, depending on whether the signalling device 150 is in the positioning neighbour list or not.

Step 209

The user equipment 120 has received the positioning neighbour list from the first network node 110. In this example the positioning neighbour list comprises the first cell 115, the s-cell 160 and the second cell 135. The user equipment 120 listens to reference signals 155 from the cells comprised in the positioning neighbour list, it therefore receives and performs time measure on the reference signals 155 transmitted by the signalling device 150. It also performs time measurement on the reference signals 155 transmitted by the other cells in the positioning neighbour list. The user equipment 120 measures the cells as instructed by the core network and follows a positioning algorithm.

Step 209

If positioning is user equipment assisted, the measurements are transmitted to the first network node 110 where the position of the user equipment 120 is estimated by a positioning method. It may also be forwarded to core network 140, e.g. to the SMLC for positioning estimation. Depending on any initial request, the position may be stored in the SMLC database and optionally transmitted to the user equipment 120.

If positioning is user equipment based, the user equipment 120 estimates its own position as instructed by the core network 140 and follows a positioning algorithm. In these embodiments the user equipment 120 sends the estimated position to the first network node 110.

The signalling device 150 may be controlled during its operation by the first network node 110 or the core network 140. For example, if no signal measurements have been received from the signalling device 150 for a certain period of time, it may either decrease the transmit power or go to an idle state. Also, since the signalling device 150 is not used for data transmission, but only transmit pre-defined signals, e.g. every 5th subframe on certain symbols, a time-frequency pattern for the measured signals can be optimized for example, by shifting the time frame and easily be implemented with the signalling device 150 without much disturbing the data transmissions. This is a particularly advantage because of bad cross-correlation properties of synchronization signals and when the interference on synchronization symbols is high e.g. in synchronous networks.

Figure 3:
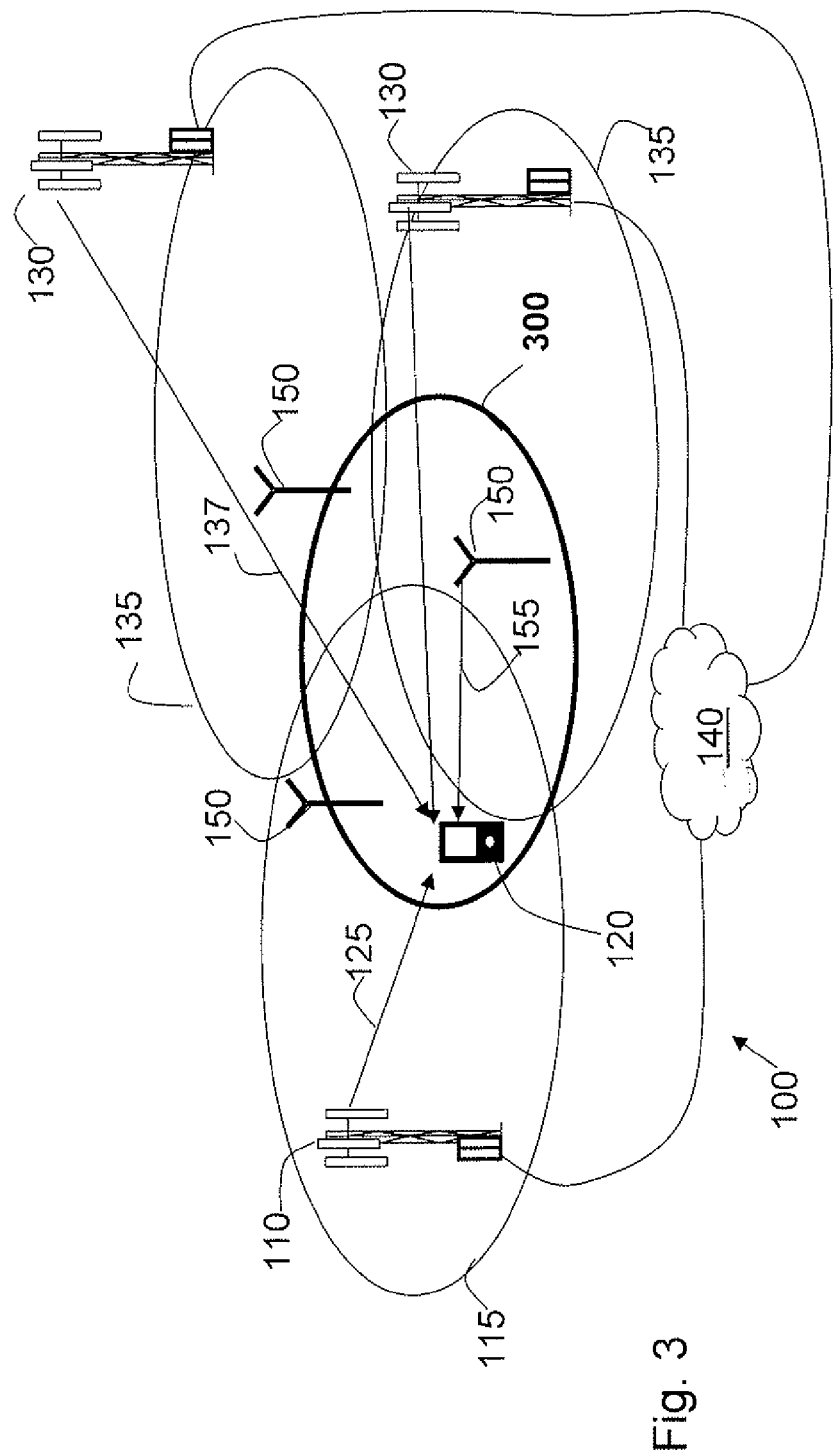
FIG. 3 is a schematic block diagram illustrating embodiments of a wireless communication network.

A plural of signalling devices 150 may also be deployed as a part of a second network 300, e.g. an autonomous network as depicted in FIG. 3. The second network 300 comprises multiple signalling devices 150 whereof three signalling devices 150 are depicted in FIG. 3. In FIG. 3, two second base network nodes 130 serving a respective second cell 135 are shown. In this case, the user equipment 120 must be aware of the signalling devices 150 positions or optionally the signalling devices 120 shall be able to communicate their positions. An example when signalling devices 120 are deployed as a part of a second network 300 is a multi-carrier network where the signalling devices 120 may be shared by multiple carriers and operate on a carrier frequency different from that on which the user equipment 120 is being served. In a multi-carrier network, the user equipment 120 needs to also be informed by the network about the signalling devices' 120 frequency which may be included, for example, in the neighbour list transmitted to the user equipment 120.

The signalling devices 150 may be manually configured or configured by the second network 300 e.g. by the similar signalling devices 150 it may be a part of.

The signalling device 150 in the present solution may be made much simpler than in the prior art positioning method used in a cellular GSM network mentioned above under background. In addition to the radio technology differences, the amount of signalling transmitted by the signalling device 150 in its simplest configuration and the reference device differ. The signalling device 150 needs only transmit a pre-configured sequence used for positioning measurements which does not contain any information by itself, and the user equipment 120 will thus not be able to connect to the signalling device 150 since the necessary information is not available, whilst in the prior art solution some additional efforts e.g., instructions from the network, power planning, etc. are needed to prevent a user equipment attempt to connect to the virtual cell. The signalling device 150 may thus be made simpler and cheaper than the prior art solution. Furthermore, the signalling device 150 may operate both in synchronized and non-synchronized modes, which may be utilized to improve the interference coordination, i.e., the signalling device 150 may transmit with a certain time shift with respect to the main network. The signalling device 150 may also form a network which may be controlled by the main network. Also, the signalling device 150 may be equipped with GPS receivers to obtain the signalling devices' coordinates that then may be communicated to the core network 140, which would simplify the deployment or reconfiguration process. There is no need to control and/or carefully plan the transmit power of the signalling device 150 which was crucial in the prior art solution.

Figure 4:
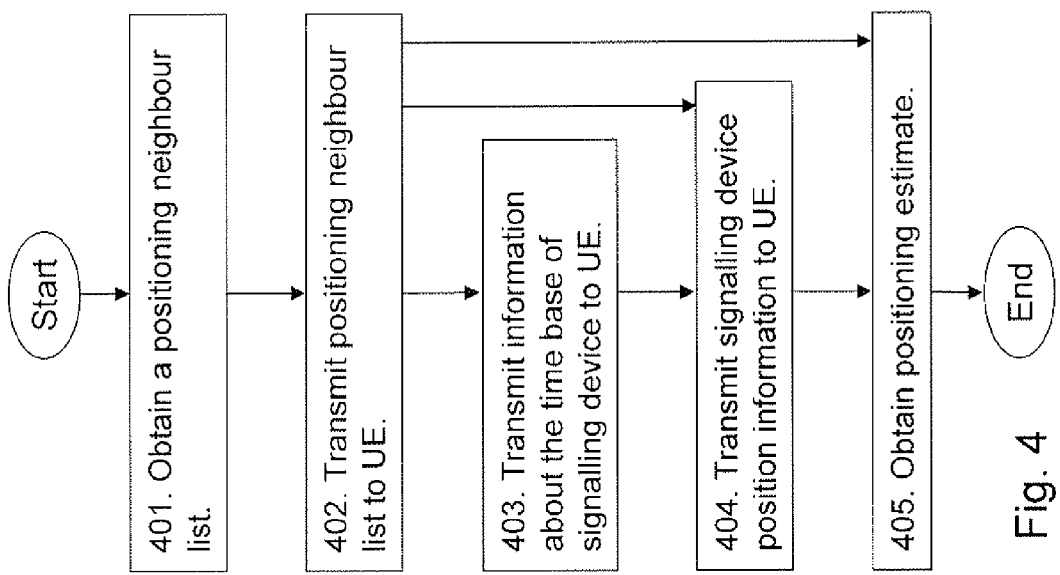
FIG. 4 is a flowchart depicting embodiments of a method in a first network node.

The method steps in the first network node 110 for assisting in positioning of the user equipment 120 based on time measurements, according to some embodiments will now be described with reference to a flowchart depicted in FIG. 4. As mentioned above the first network node 110 is comprised in a wireless LTE network 100. The time measurements may be represented by OTDOA or TOA or any other method based on time measurements. The LTE network 100 may comprise its further evolutions. The method comprising the following steps, which steps may as well be carried out in another suitable order than described below:

Step 401
The first network node 110 obtains a positioning neighbour list of neighbour cells associated to a serving area of the first network node 110. The positioning neighbour list comprises the s-cell 160. The s-cell 160 is associated to the signalling device 150. The s-cell 160 is recognized by the first network node 110 as an s-cell with limited functionality and is therefore not considerable for the user equipment 120 as a candidate cell for serving the user equipment 120 for data transmission.

Step 402
The first network node 110 transmits the positioning neighbour list or the information necessary for the user equipment to find out the list of neighbour cells to be measured to the user equipment 120. The positioning neighbour list or information enables the user equipment 120 to find the s-cell 160 and perform time measurement on reference signals 155 transmitted by the associated signalling device 150.

In some embodiments, the first network node 110 may also transmit information about the frequency and timing that signalling device 150 uses for transmitting the reference signals 155 in this step. This information enables the user equipment 120 to perform time measurement on the reference signals 155 in embodiments wherein the signalling device 150 is part of a multi carrier network 300. This information about the frequency and timing that signalling device 150 uses for transmitting the reference signals 155, may be comprised in the transmitted positioning neighbour list.

Step 403
This is an optional step. The first network node 110 may transmit information about the time base of the signalling device 150 to the user equipment 120. The time base information enables the user equipment 120 to perform time measurement on reference signals 155 transmitted by the signalling device 150 when the signalling device 150 and the first network node 110 have different time bases.

Step 404
This step is optional and may be performed in some embodiments wherein the user equipment 120 calculates its own position, but it is not relevant if this is done by the core network 140 or the first network node 110. In this step the first network node 110 transmits information about the position of the signalling device 150 to the user equipment 120. The information together with the time measurement performed on the reference signals 155 transmitted by the signalling device 150 and reference signals 155 transmitted by other cells comprised in the positioning neighbour list enables the user equipment 120 to calculate its position.

Step 405
The first network node 110 obtains from the user equipment 120 a measurement report or a positioning estimate of the user equipment 120. The measurement report or positioning estimate is based on the time measurement by the user equipment 120 performed on the reference signals 155 transmitted by the signalling device 150. The positioning estimate is further based on at least two further time measurements performed by the user equipment 120. The obtained a positioning estimate of the user equipment 120 may be received from the user equipment 120. The position calculation may have been done in the user equipment 120.

The first network node 110 may obtain the measurement report in cases the position of the user equipment 120 is calculated by the core network 140. The first network node 110 may calculate the position itself based on the measurement report or forward the measurement report to further to other network elements.

Figure 5:
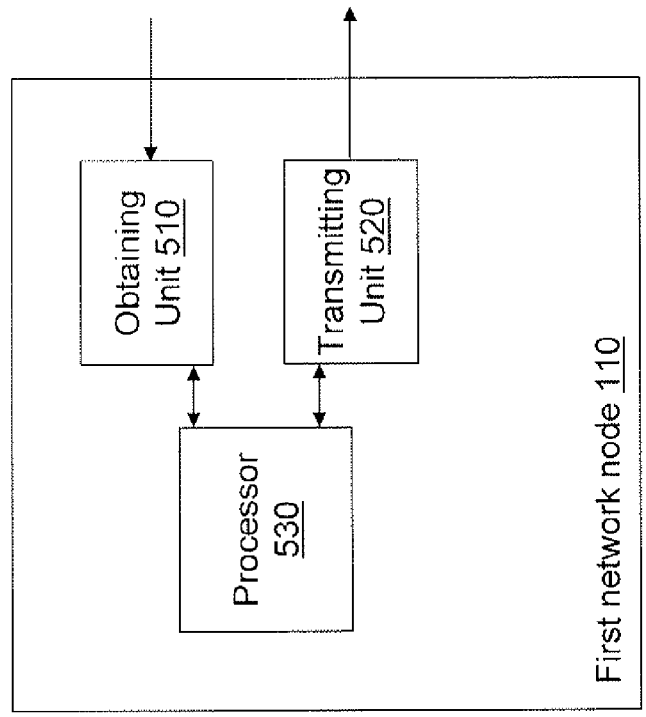
FIG. 5 is a schematic block diagram illustrating embodiments of a first network node.

The first network node 110 may obtain positioning estimate of the user equipment 120 if the user equipment 120 calculates its own position based on own measurements. In this case a positioning measurement report is not required to be transmitted to the first network node 110. However, a positioning measurement may in some cases be utilized for other purposes, in these cases a measurement report is obtained from the user equipment 120 also in the case where the user equipment 120 calculates its own position and may or may not be forwarded further to other network elements The first network node 110 performing the method steps above for assisting in positioning of a user equipment 120 based on time measurements, is depicted in FIG. 5. As mentioned above, the first network node 110 is comprised in the wireless LTE network 100. The LTE network 100 may comprise its further evolutions. The time measurements may be represented by OTDOA or TOA measurements.

The first network node 110 comprises an obtaining unit 510 configured to obtain a positioning neighbour list of neighbour cells associated to a serving area of the first network node 110. The positioning neighbour list comprises the s-cell 160. The s-cell 160 is associated to the signalling device 150. The s-cell 160 is recognized by the first network node 110 as an s-cell with limited functionality and is therefore not considerable for the user equipment 120 as a candidate cell for serving the user equipment 120 for data transmission.

The obtaining unit 510 is further configured to obtain from the user equipment 120 a measurement report or a positioning estimate of the user equipment 120. The measurement report or positioning estimate is based on the time measurement performed by the user equipment 120 on the reference signals 155 transmitted by the signalling device 150.

The first network node 110 further comprises a transmitting unit 520 configured to transmit the positioning neighbour list or the information necessary for the user equipment to find out the list of neighbour cells to be measured to the user equipment 120. The positioning neighbour list enables the user equipment 120 to find the s-cell 160 and perform time measurement on reference signals 155 transmitted by the associated signalling device 150

The transmitting unit 520 may further be configured to transmit information about the time base of the signalling device 150 to the user equipment 120. The time base information enables the user equipment 120 to perform time measurement on reference signals 155 transmitted by the signalling device 150 when the signalling device 150 and the first network node 110 have different time bases.

The transmitting unit 520 may further be configured to transmit information about the position of the signalling device 150 to the user equipment 120. The information together with the time measurement performed on the reference signals 155 transmitted by the signalling device, and reference signals 155 transmitted by other cells comprised in the positioning neighbour list enables the user equipment 120 to calculate its position.

The transmitting unit 520 may further be configured to transmit to the user equipment 120, information about the frequency and timing that the signalling device 150 uses for transmitting the reference signals 155. The information enables the user equipment 120 to perform time measurement on the reference signals 155 when the signalling device 150 is part of a multi carrier network. This information about the frequency and timing that signalling device 150 uses for transmitting the reference signals 155, may be comprised in the positioning neighbour list.

The method steps in the signalling device 150 for assisting in positioning of a user equipment 120 based on time measurements according to some embodiments will now be described with reference to a flowchart depicted in FIG. 6. As mentioned above. The signalling device 150 is associated to the s-cell 160. The s-cell 160 is not considerable for the user equipment 120 as a candidate cell for serving the user equipment 120 for data transmission. The signalling device associated s-cell 160 is comprised in a positioning neighbour list of neighbour cells. The positioning neighbour list is obtained in the first network node 110 comprised in the wireless LTE network 100. The LTE network 100 may also comprise its further evolutions. The neighbour cells in the list are adapted to be performed time measurement on by the user equipment 120 for enabling positioning. The time measurements may be represented by OTDOA or TOA measurements.

In some embodiments the signalling device 150 is part of second network 300, for example an autonomous network or a multi carrier network. This second network 300 may or may not be connected to and coordinated by the LTE network 100. In these embodiments, the signalling device 150 may be deployed in a multi carrier network, and the signalling device 150 may be shared by multiple carriers and operates on a low-interference carrier. The signalling device 150 may be shared by multiple carriers and operate on a low-interference carrier which is different from that on which the user equipment 120 is being served by the first network node 110.

In some embodiments, the signalling device 150 may be connected to the core network 140 and may be controlled by the core network 140 during operation. The signalling device 150 may e.g. be connected to the core network 140 directly, or a set of signalling devices 150 may form the second network 300 of signalling devices 150 and be connected to the core network 140 through this second network 300 of signalling devices 150.

The method comprises the following steps that may as well be carried out in another suitable order than described below:

Step 601

This is an optional step. The signalling device 150 may receive configuration data from the core network 140 or from the second network 300.

Step 602

In this step the signalling device 150 is configured to transmit pre-defined reference signals 155 in predefined subframes and according to a predefined pattern relating to preselected subcarriers and preselected time slots within a subframe. The configuration data for performing the configuration may be received in the step above.

Step 603

The signalling device 150 obtains synchronisation information.

This step may be performed by calculating the synchronisation information or receiving the synchronisation information from the LTE network 100. The following approaches may be used. The signalling device 150 may be able to define the absolute own time, e.g. by means of GPS, and needs to know the relation between the GPS time and LTE subframe number signalled by the first network node 110 or preconfigured in the signalling device 150. Alternatively, when the signalling device 150 is not equipped with a GPS receiver, a time aligning mechanism with respect to the serving cell 115 may be used. A third alternative may be to calculate it with a help of a GPS receiver that enables the absolute time calculation and utilizing the synchronisation information from the LTE network 100.

Step 604

This is an optional step. The signalling device 150 may transmit, information about the position of the signalling device 150 to the user equipment 120. The information enables the user equipment 120 to calculate its position together with time measurements performed on the transmitted reference signals 155. The information may be transmitted by broadcasting.

The time frames of the transmitted reference signals 155 may be shifted by a preconfigured number of time slots. The preconfigured number of time slots of a length may be shorter than the length of a subframe, e.g. an OFDM symbol. The time shifts may, for example, be calculated by the signalling device 150 itself e.g., based on the s-cell IDentity (ID), statically configured or received from the network 300 of signalling devices or the core network 140.

Step 605

The signalling device 150 transmits reference signals 155 according to the configuration and being synchronized according to the obtained synchronisation information. This enables the user equipment 120 to receive and time measure on the transmitted reference signals 155 for positioning when the signalling device associated s-cell 160 is comprised in the positioning neighbour list.

The reference signals 155 being transmitted may e.g. be represented by PRS, CRS, SS, or any other suitable reference signals.

The signalling device 150 performing the method steps above for assisting in positioning of a user equipment 120 based on time measurements, is depicted in FIG. 7, As mentioned above, the signalling device 150 is associated to the s-cell 160. The s-cell 160 is not considerable for the user equipment 120 as a candidate cell for serving the user equipment 120 for data transmission. The signalling device associated s-cell 160 is comprised in a positioning neighbour list of neighbour cells. The positioning neighbour list is obtained in the first network node 110 within an LTE network 100. The LTE network 100 may also comprise its further evolutions The neighbour cells in the list are adapted to be performed time measurement on by the user equipment 120 for enabling positioning. The time measurements may be represented by OTDOA or TOA measurements.

In some embodiments the signalling device 150 is part of a second network 300, for example an autonomous network or a multi carrier network. This second network 300 may or may not be connected to and coordinated by the LTE network 100. In these embodiments, the signalling device 150 may be deployed in a multi carrier network, and the signalling device 150 may be shared by multiple carriers and operates on a low-interference carrier. The signalling device 150 may be shared by multiple carriers and operate on a low-interference carrier which is different from that on which the user equipment 120 is being served by the first network node 110.

In some embodiments, the signalling device 150 may be connected to the core network 140 and may be controlled by the core network 140 during operation. The signalling device 150 may e.g. be connected to the core network 140 directly, or a set of signalling devices 150 may form the second network 300 of signalling devices 150 and be connected to the core network 140 through this second network 300 of signalling devices 150.

The signalling device 150 comprises a configuring unit 710 adapted to configure the signalling device 150 to transmit predefined reference signals 155 in predefined subframes and according to a predefined pattern relating to preselected sub-carriers and preselected time slots within a subframe.

The signalling device 150 further comprises an obtaining unit 720 configured to obtain synchronisation information.

The obtaining unit 720 may further be configured to obtain the synchronisation information by calculating it or receiving the synchronisation information from the LTE network 100.

In some embodiments, the obtaining unit 720 is further configured to receive configuration data from the core network 140.

The signalling device 150 further comprises a transmitting unit 730 configured to transmit reference signals 155 according to the configuration and being synchronized according to the obtained synchronisation information. This enables the user equipment 120 to receive and time measure on the transmitted reference signals 155 for positioning when the signalling device associated s-cell 160 is comprised in the positioning neighbour list.

The reference signals 155 adapted to be transmitted may be represented by PRS, CRS, SS, or any other suitable reference signals.

In some embodiments, the time frames of reference signals 155 to be transmitted are shifted by a preconfigured number of time slots.

In some embodiments, the transmitting unit 730 is further configured to transmit to the user equipment 120, information about the position of the signalling device 150. The information enables the user equipment 120 to calculate its position together with time measurements performed on the transmitted reference signals 155. The information may be transmitted by broadcasting.

The present mechanism assisting in positioning of the user equipment 120 based on time measurements, may be implemented through one or more processors, such as a processor 530 in the first network node 110 depicted in FIG. 5, or a processor 740 in the signalling device 150 depicted in FIG. 7, together with computer program code for performing the functions of the present solution. The program code mentioned above may also be provided as a computer program product, for instance in the form of a data carrier carrying computer program code for performing the present solution when being loaded into the first network node 110 or the signalling device 150. One such carrier may be in the form of a CD ROM disc. It is however feasible with other data carriers such as a memory stick. The computer program code can furthermore be provided as pure program code on a server and downloaded to the first network node 110 or the signalling device remotely.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a first network node, for assisting in positioning of a user equipment based on time measurements, the first network node being comprised in a wireless Long Term Evolution communications network "LTE network", the method comprising:

obtaining a positioning neighbor list of neighbor cells associated with a serving area of the first network node, the positioning neighbor list comprises a special-purpose cell "s-cell", the s-cell is associated with a signalling device, the s-cell being recognized by the first network node as having limited functionality and is therefore not considerable for the user equipment as a candidate cell for serving the user equipment for data transmission;

transmitting the positioning neighbor list or information necessary for the user equipment to find out the list of neighbor cells to be measured by the user equipment;

the positioning neighbor list or the information enables the user equipment to find the s-cell and to perform time measurement on reference signals transmitted by the associated signalling device;

obtaining from the user equipment a measurement report or a positioning estimate of the user equipment, the measurement report or positioning estimate is based on the time measurement performed by the user equipment on the reference signals transmitted by the signalling device; and transmitting to the user equipment, information about the frequency and timing that the signalling device uses for transmitting the reference signals, the frequency and timing information enables the user equipment to perform time measurement on the reference signals when the signalling device is part of a multi carrier network;

wherein a coverage area of the s-cell overlaps a portion of the serving area of the first network node and a portion of a serving area of a second network node corresponding to one of the neighbor cells in the neighbor list, the serving areas of the first network node and the second network node being considerable as candidate cells for serving the user equipment for data transmission.

2. The method according to claim 1, wherein the time measurements are represented by Observed Time Difference Of Arrival "OTDOA" or Time Of Arrival "TOA" measurements.

3. The method according to claim 1, further comprising:
transmitting to the user equipment, information about the time base of the signalling device, the time base information enabling the user equipment to perform time measurement on the reference signals transmitted by the signalling device when the signalling device and the first network node have different time bases.

4. The method according to claim 1, further comprising:
transmitting to the user equipment, information about the position of the signalling device, the position information together with the time measurement performed on the reference signals transmitted by the signalling device, and reference signals transmitted by other cells comprised in the positioning neighbor list enables the user equipment to calculate its position.

5. The method according to claim 4, wherein the information about the frequency and timing that the signalling device uses for transmitting the reference signals, is comprised in the transmitted positioning neighbor list.

6. A first network node, for assisting in positioning of a user equipment based on time measurements, the first network node being comprised in a wireless Long Term Evolution communications network "LTE network", the first network node comprising:

an obtaining unit configured to obtain a positioning neighbor list of neighbor cells associated with a serving area of the first network node, the positioning neighbor list comprises a special-purpose cell "s-cell", the s-cell is associated with a signalling device, the s-cell being recognized by the first network node as an s-cell with limited functionality and is therefore not considerable for the user equipment as a candidate cell for serving the user equipment for data transmission;

the first network node further comprising a transmitting unit configured to transmit to the user equipment, the positioning neighbor list or the information necessary for the user equipment to find out the list of neighbor cells to be measured;

the positioning neighbor list enables the user equipment to find the s-cell and perform time measurement on reference signals transmitted by the associated signalling device; and wherein the obtaining unit further is configured to obtain from the user equipment, a measurement report or a positioning estimate of the user equipment, the measurement report or positioning estimate is based on the time measurement by the user equipment performed on the reference signals transmitted by the signalling device;

wherein the transmitting unit further is configured to transmit to the user equipment, information about the frequency and timing that the signalling device uses for transmitting the reference signals, the information enables the user equipment to perform time measurement on the reference signals when the signalling device is part of a multi carrier network;

wherein a coverage area of the s-cell overlaps a portion of the serving area of the first network node and a portion of a serving area of a second network node corresponding to one of the neighbor cells in the neighbor list, the serving areas of the first network node and the second network node being considerable as candidate cells for serving the user equipment for data transmission.

7. The first network node according to claim 6, wherein the time measurements are represented by Observed Time Difference Of Arrival "OTDOA" or Time Of Arrival "TOA" measurements.

8. The first network node according to claim 6, wherein the transmitting unit further is configured to transmit to the user equipment, information about the time base of the signalling device, the time base information enables the user equipment to perform time measurement on reference signals transmitted by the signalling device when the signalling device and the first network node have different time bases.

9. The first network node according to claim 6, wherein the transmitting unit further is configured to transmit to the user equipment, information about the position of the signalling device, the information together with the time measurement performed on the reference signals transmitted by the signalling device and reference signals transmitted by other cells comprised in the positioning neighbor list enables the user equipment to calculate its position.

10. The first network node according to claim 6, wherein the information about the frequency and timing that the signalling device uses for transmitting the reference signals, is comprised in the positioning neighbor list.

* * * * *

UNITED STATES PATENT AND TRADEMARK OFFICE
CERTIFICATE OF CORRECTION

Page 1 of 2

PATENT NO. : 8,838,141 B2
APPLICATION NO. : 13/322065
DATED : September 16, 2014
INVENTOR(S) : Siomina et al.

It is certified that error appears in the above-identified patent and that said Letters Patent is hereby corrected as shown below:

On the Title Page, in item (75), under "Inventors", in Column 1, Line 2, delete "Lidingo" and insert -- Lidingö --, therefor.

In the Drawings

In Fig. 7, Sheet 5 of 5, delete Tag "720" (above tag 740) and insert Tag -- 710 --, therefor.

In the Specification

In Column 3, Lines 16-17, delete "is a also need" and insert -- is also a need --, therefor.

In Column 7, Line 14, delete "fore" and insert -- for --, therefor.

In Column 8, Line 62, delete "s-cell 155" and insert -- s-cell 160 --, therefor.

In Column 10, Line 46, delete "will no be" and insert -- will not be --, therefor.

In Column 11, Line 35, delete "pica," and insert -- pico, --, therefor.

In Column 12, Line 45, delete "step 209" and insert -- step 210 --, therefor.

In Column 13, Line 15, delete "devices 120" and insert -- devices 150 --, therefor.

In Column 13, Line 16, delete "devices 120" and insert -- devices 150 --, therefor.

In Column 13, Line 18, delete "devices 120" and insert -- devices 150 --, therefor.

Signed and Sealed this
Twenty-first Day of April, 2015

Michelle K. Lee
*Director of the United States Patent and Trademark Office*

CERTIFICATE OF CORRECTION (continued)
U.S. Pat. No. 8,838,141 B2

In Column 13, Line 22, delete "devices' 120" and insert -- devices 150 --, therefor.

In Column 17, Line 26, delete "7, As" and insert -- 7. As --, therefor.